United States Patent [19]
Cover

[11] Patent Number: 4,486,701
[45] Date of Patent: Dec. 4, 1984

[54] THERMAL ENERGY CONVERSION

[76] Inventor: John H. Cover, 24742 Via San Fernando, Mission Viejo, Calif. 92691

[21] Appl. No.: 342,391

[22] Filed: Jan. 25, 1982

[51] Int. Cl.³ .................... H02K 44/00; H02N 4/02
[52] U.S. Cl. .................................. 322/2 R; 310/11; 310/300
[58] Field of Search ............... 322/2 R, 2 A, 35, 47; 310/306, 300, 11; 290/43, 54, 1 R; 323/906; 204/129, 130

[56] References Cited

U.S. PATENT DOCUMENTS

| | | | |
|---|---|---|---|
| 3,375,664 | 4/1968 | Wells, Jr. .................... | 310/11 |
| 3,443,129 | 5/1969 | Hammit ........................ | 310/11 |
| 3,616,334 | 10/1971 | Aker et al. ................... | 204/129 |
| 3,878,410 | 4/1975 | Petrick et al. ................ | 310/11 |
| 3,999,089 | 12/1976 | Barros ......................... | 310/11 |
| 4,127,453 | 11/1978 | Radebold ..................... | 310/300 X |
| 4,191,901 | 3/1980 | Branover ...................... | 310/306 X |
| 4,381,462 | 4/1983 | Radebold ..................... | 310/11 |

FOREIGN PATENT DOCUMENTS 2405134  8/1975  Fed. Rep. of Germany ........ 310/11

Primary Examiner—R. J. Hickey
Attorney, Agent, or Firm—Knobbe, Martens, Olson & Bear

[57] ABSTRACT

A system is disclosed for converting thermal energy into chemical energy by means of a low-temperature process. A liquid flow loop with two vertical columns that are interconnected at the top and bottom circulates an electrically conducting fluid, such as mercury. A convective flow of this electrically conducting fluid is established by heating the fluid in one of the columns and cooling the fluid in the other column to establish a weight differential between the fluid in the two columns. A magnetohydroynamic generator is placed on this loop so that, as the fluid flows through the loop and through the generator, electrical energy is generated. This electrical energy is used to electrolize a second fluid, such as a solution of sulphuric acid, into gasses such as hydrogen and oxygen. The gasses so generated are injected into the rising column of the electrically conducting fluid to increase the weight differential between the fluid in the two columns and enhance the convective flow of that fluid. These gasses, which contain chemical energy, are then removed from the loop at the top of this column.

13 Claims, 8 Drawing Figures

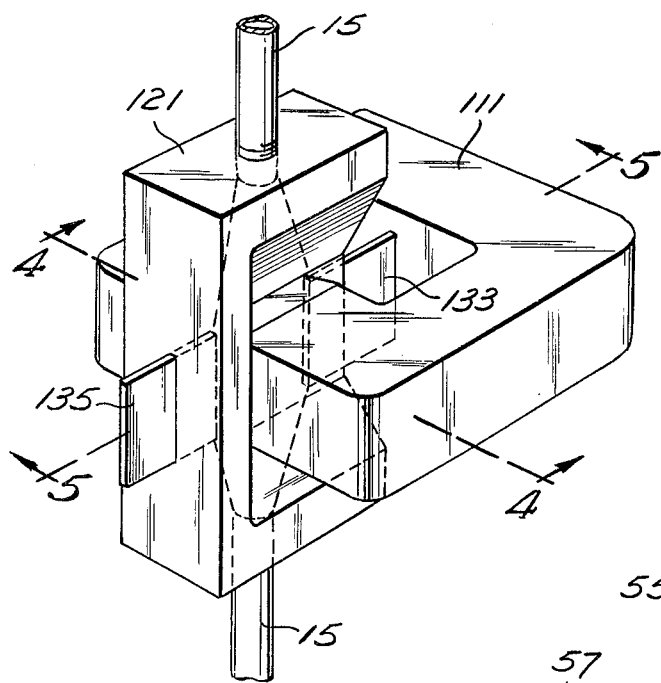
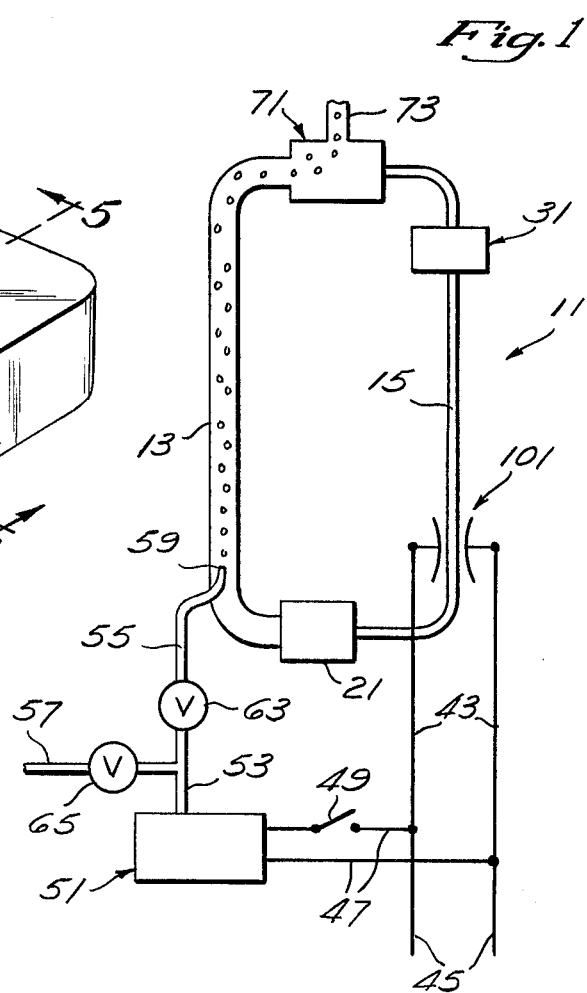
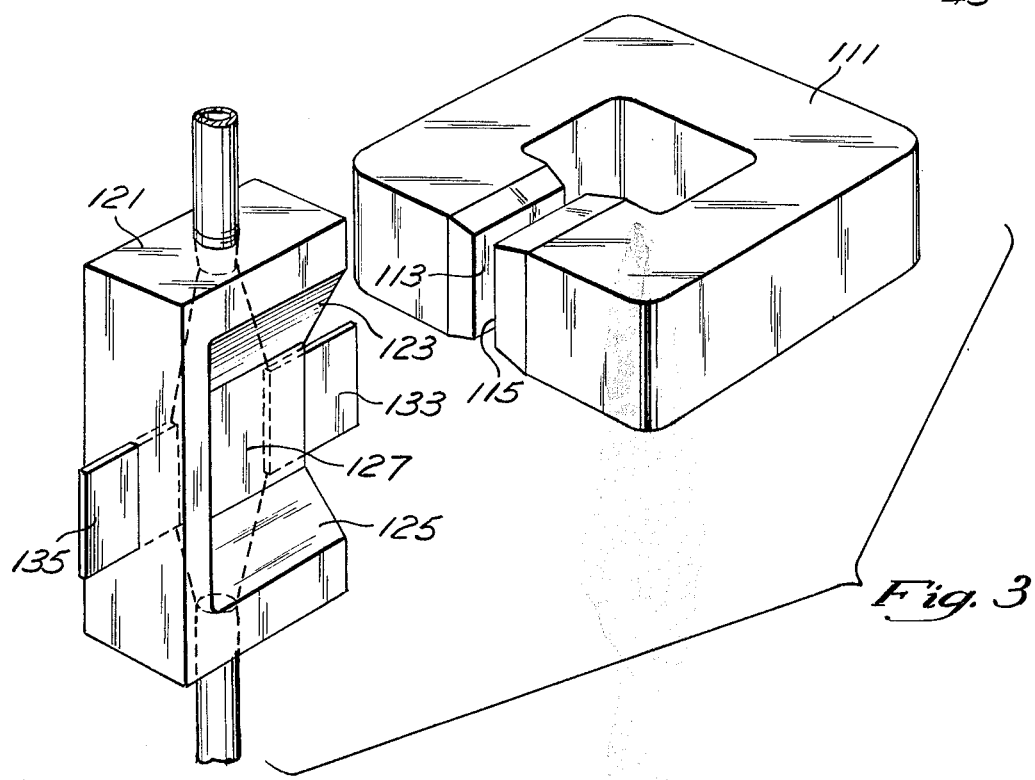

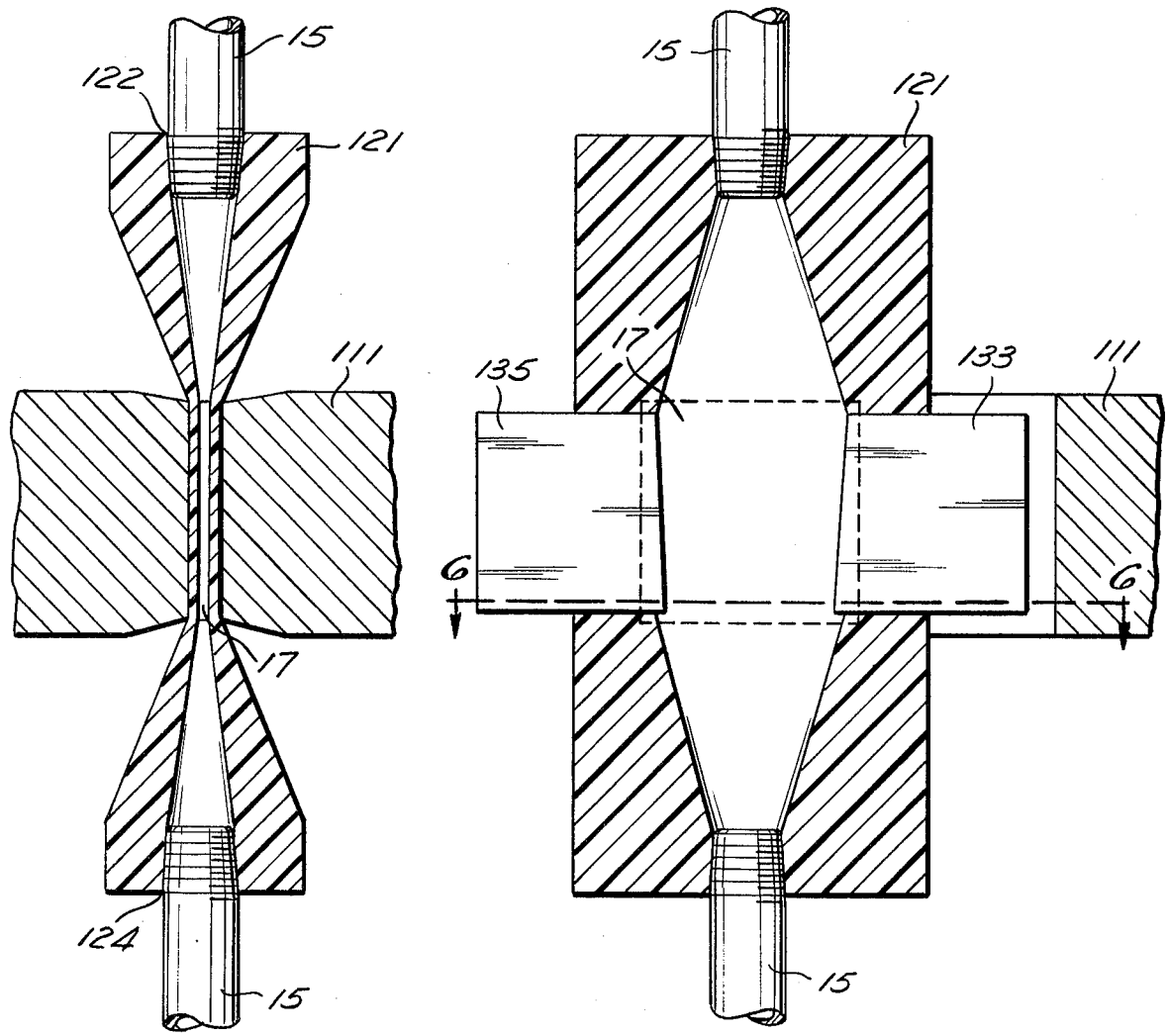

THERMAL ENERGY CONVERSION

BACKGROUND OF THE INVENTION

With the advent of higher prices for the energy the world consumes, much interest has been generated in new sources of energy and in more efficient uses of this energy. One of the energy conversion devices for which promise has been held is the magnetohydrodynamic generator (MHD). The basis for the operation of an MHD is that passing an electrically conducting fluid through a strong magnetic field will produce an electric potential between opposite sides of the throat through which the conducting fluid flows. The magnitude of the power generated with a given fluid is proportional to the velocity of the fluid through the throat.

MHD development has typically focused on the use of high temperature, high pressure gas or plasma, although some systems have been developed using an electrically conducting liquid. The temperature of the plasma or liquid used in these devices is usually on the order of several hundred to a few thousand degrees Celsius. The pressure under which the working fluid operates is also very high in most systems, on the order of several hundred to a few thousand pounds per square inch. The use of such high temperature and pressure fluids limits the choice of materials out of which the system can be made. The high temperatures and high pressures in these systems also make the systems prone to leaks and contribute to the rapid deterioration of machinery such as pumps used in the system.

To provide the flow of conducting fluid through the MHD throat, some systems have incorporated means for establishing a convective flow of the fluid around a closed loop. This convective flow is established by heating the fluid at one point in the loop and cooling it at another. Such a system is shown in U.S. Pat. No. 3,375,664 to Wells. It has been found, though, that the low velocity thus obtained has not been sufficient to permit the MHD to generate more than a few milliwatts of power even with vertical leg members up to 100 feet tall. Another means of causing a flow of the conducting fluid through an MHD loop has been to establish a convective flow by introducing a gas into part of the loop to create a density differential between the fluid in different sections of the loop. This has typically been accomplished by boiling either the conducting liquid or a second fluid and using the vapor bubbles to leviate one column of the fluid. A system that operates in this manner is disclosed in U.S. Pat. No. 3,443,129 to Hammitt. Such systems, however, have been troublesome, since boiling the fluid takes thermal energy from the system, reducing the heat in the conducting fluid in the rising column. Also, the height and temperature of the rising column are severely constrained by the need to prevent condensation of the gas bubbles before they reach the top of the column.

SUMMARY OF THE INVENTION

The present invention efficiently converts thermal energy (heat) into an alternate form of energy by means of a low-temperature process. The invention consists of a fluid flow loop with two vertical columns interconnected at the top and the bottom. The fluid that flows in this loop is an electrically conducting fluid, preferably a liquid such as mercury. The column in which the fluid rises is heated to a temperature of approximately 40°-150° C. by a thermal source and the column in which the fluid flows down is cooled to a temperature of approximately 0°-30° C. by means of a lower temperature heat sink. The difference in the density of the fluid in these columns induces a convective flow of that fluid through the loop. An MHD is coupled to one of these vertical columns. The MHD includes a magnet that creates a strong magnetic field perpendicular to the flow of the fluid. As the fluid flows through throat sections that have electrodes in contact with the fluid, an electric potential is generated between the electrodes, causing an electric current to flow through the electrodes and through an external electric circuit, from which power may be drawn. The key to the present invention is that the electric power so produced is largely fed back to augment, or speed up, the flow of the conducting liquid. This is accomplished by using the electric power to dissociate water molecules in an electrolytic solution, such as sulfuric acid, $H_2SO_4$, and inject some or all of the gasses obtained ($H_2$ and $O_2$) into the rising column of conducting liquid. The gas is removed from the loop at the top of the rising column and may be put to any of a number of uses. The remainder of the gases, which are not injected into the loop may be taken directly from the electrolysis and put to use. Among the possible uses for the gasses produced by this system are burning to produce heat, power and pure water using them to synthesize other fuels, such as methane or methanol. The introduction of the gas into the rising column greatly reduces the density and weight of the rising column of electrically conducting liquid, and hence increases the weight difference between the two columns of liquid. As the weight difference between the columns is increased, the convective flow of the liquid is increased, further increasing the production of electrical energy. With the increased electrical output, more gasses are produced, and the convective flow velocity of the liquid is further increased, which additionally increases the amount of electric power generated by the MHD. The rate of generation of the electrolyzed gasses is increased until an equilibrium is established between the generation of the gasses and the viscous and other flow retarding forces.

The Thermal Energy Conversion System of the present invention has numerous advantages over the MHD systems previously developed. These advantages include:

(1) lower operating temperatures for the working fluid;
(2) lower pressures in the system loop;
(3) less severe constraints on the design and size of the system components;
(4) less severe constraints on the choice of materials out of which the systemn components are made; and
(5) greater power output with a smaller system due to increased operating efficiency.

BRIEF DESCRIPTION OF THE DRAWINGS

FIG. 1 is a schematic drawing of the Thermal Energy Conversion System of the present invention.

FIG. 2 is a perspective view of the magnetohydrodynamic generator coupled to the fluid flow loop.

FIG. 3 is a perspective view of the magnetohydrodynamic generator with the magnet withdrawn from the throat section of the fluid flow loop.

FIG. 4 is a cross-sectional view of the magnetohydrodynamic generator used in the present invention taken along line 4—4 of FIG. 2.

FIG. 5 is a cross-sectional view taken along line 5—5 of FIG. 2.

FIG. 6 is a cross-sectional view taken along line 6—6 of FIG. 2.

DESCRIPTION OF THE PREFERRED EMBODIMENT

General System

Figure 7:
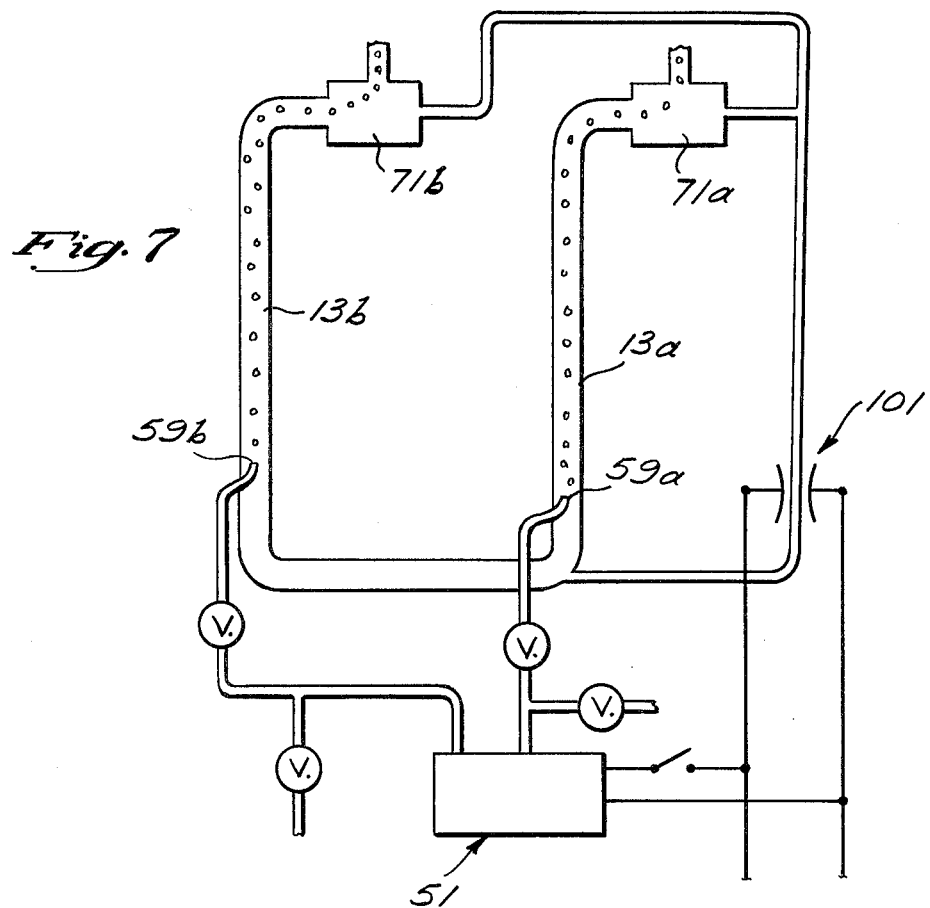
FIG. 7 is a schematic drawing of a first alternative embodiment of the Thermal Energy Conversion System.

The system of the present invention is shown schematically in FIG. 1. It comprises a fluid loop 11 that is preferably closed, including first and second vertical columns or legs 13 and 15 that are interconnected at the top and bottom. A conducting fluid, such as liquid mercury, flows through the loop 11. Liquid mercury is advantageous becaause of its high electrical conductivity, high density, and low specific heat value, but other electrically conductive fluids such as electrolytic solutions may also be used, depending on cost considerations, equipment design or availability, or other factors. On the second column 15 is an electric generator 101, such as a magnetohydrodynamic generator (MHD) 101. Electrical leads 43 transmit the electric potential generated by the MHD 101.

A source of thermal energy 21 is coupled to the loop near the bottom of the first column 13. This source 21 may be virtually any type of thermal energy source, including a burner for fossil fuels or a heat exchanger drawing heat from a reservoir heated by either solar energy or geothermal energy. The temperature increase provided by the thermal energy source 21 depends upon the environment in which the system operates. This temperature increase can range from 20° to 100° C. or more, and is preferably at least 40° C.

A heat exchanger 31 is connected to the loop near the top of the second column 15 to draw heat from the conducting fluid and transfer it to a heat sink, such as a large body of cool water that is isolated from the sun, or some other low temperature body, which may be a body of ice if the system is used in a particularly cold environment.

A gas injector 59 for introducing gas into the system loop is placed near the bottom of the first column 13. Gas injector 59 is a gas nozzle outlet of conventional design and is substantially centrally located in column 13.

A gas separator 71 is coupled to the loop near the top of the first leg 13. Separator 71 may be of conventional design for drawing gas from a two-phase flow. Gas separator 71 permits the liquid mercury to continue flowing around the loop, while removing the gasses introduced by gas injector 59 to be drawn off through outlet 73. Outlet 73 is connected so that the gasses may be put to other uses, such as burned to produce heat or power, stored to be burned later, or used to synthesize other fuels, such as methane or methanol.

An electrolytic gas generator 51 uses the electrical energy generated by the MHD 101 to electrolyze an electrolyte, such as a solution of sulfuric acid ($H_2SO_4$) to generate hydrogen and oxygen gas, which contain chemical energy. The pressure at which the gas generator must be capable of producing the gasses depends upon the static prssure column 13 at gas injector 59 caused by the column of mercury, since, to enter the column, the gas must be at a pressure at least as great as that of that static pressure. This static pressure depends on the height of the columns 13 and 15. For a small system with short columns, the gas genertor 51 need only produce the gas at a pressure of a few pounds per square inch, while a gas generator coupled to a system using much taller columns needs to produce the gas at a pressure on the order of a few hundred pounds per square inch.

Outlet 53 from the gas generator 51 is preferably designed to keep the oxygen and hydrogen formed by the gas generator separate, since together they form a potentially exposive mixture. Outlet 53 branches into pipes 55 and 57. Pipe 55 leads to gas injector 59, so that part or all of the gasses generated by the electrolytic gas generator 51 may be injected into the first column 13. Valve 63 is provided on pipe 55 to control the volume of gas entering the fluid flow loop. Pipe 57 leads to a device for either storing or using the gasses. Advantageously, pipe 57 also keeps the gasses segregated, so that some of whichever of the gasses is injected into the column 13 may, if desired, also be diverted away from the flow loop, and stored or used directly. Valve 65 on pipe 57 controls the volume of gas being diverted away from the flow loop. Adjusting the valves 63 and 65 permits careful control of the portion of the gasses that goes directly to other uses and the portion introduced into the fluid flow loop.

Electrical leads 43 and 47 permit the power generated by the MHD 101 to be transferred to the electrolytic gas generator 51. This feedback of the power generated back into the system greatly increases the system's efficiency. Leads 45 permit power that is not used to operate the gas generator 51 to be drawn off the system and used for other purposes.

The MHD

The MHD 101, shown in FIGS. 2–6, includes a magnet 111 with closely juxtaposed north and south poles 115 and 113, a nonferromagnetic block 121, and electrodes 133 and 135. Between the poles 115 and 113 is a throat section 17 of the block 121 (FIG. 4). This throat section 17 is defined by two closely juxtaposed rectangular walls 127 and 129 to allow a thin sheet of the mercury to pass between the poles of the magnet. The magnetic poles 113 and 115 are closely juxtaposed to maximize the intensity of the magnetic field across the sheet of mercury passing through throat section 17. Block 121 further includes threaded openings 122 and 124 for receiving the ends of the tubular piping that forms the remainder of the second column 15. The passage through which the mercury passes is tapered within the portions of the block 121 above and below the throat section 17 to form a transition between the tubular section of the second leg 15 and the thin throat section 17. As shown in FIG. 2, the exterior of the block 121 is also narrowed at throat section 17 so it will fit between the poles 113 and 115 of the magnet 111.

Electrodes 133 and 135 (FIG. 5) are placed on either side of this throat section 17 to tap the electric potential created between these two sides of the throat section. These electrodes are advantageously shaped so that continuous contact between the electrodes and the mercury flowing through the throat section 17 is promoted.

The throat section 17 is sized so that a venturi effect provides a ratio of approximately five to one between the speed of the mercury through the throat and the speed through the other sections of the loop.

The fluid flow passage through the MHD 101 must be constructed to contain the mercury flowing through it, particularly at the threaded openings 122 and 124, and at the points at which electrodes 133 and 135 enter throat section 17. But the passage is not subjected to the very high pressures that the MHD throat sections of systems that use a plasma as the working fluid must contain.

The Electrolytic Gas Generator

Electrolysis occurs when an electric current is passed through an electrolyte between two electrodes, an anode and a cathode. Ions in the solution move to and from the anode and cathode so that material may be transported and deposited on one of the electrodes, new compounds may be formed, or gasses may be liberated. Certain electrolytes, such as sulfuric acid, sodium hydroxide, and potassium carbonate, when dissolved in water, cause the water itself to decompose into its component parts, hydrogen and oxygen, when a current is passed through the solution.

The amount of material or gas formed by the electrolysis can be found using Faraday's Laws, which say that (1) the amount of chemical change produced by an electric current is proportional to the quantity of electricity and (2) the amounts of different substances liberated by a given quantity of electricity are proportional to their chemical equivalent weights. (Equivalent weight=atomic weight divided by valence change.) Thus, the amount of material or gas produced is proportional to the current passed through the solution. When water is electrolyzed, the volume of hydrogen and oxygen produced is proportional to the current passed through the solution.

An example of a simple electrolytic gas generator that may be installed in the present system as gas generator 51 is a fully charged automobile storage battery comprising lead plates immersed in a solution of sulfuric acid. As current is passed through the solution in the cell the water in the solution is dissociated into hydrogen and oxygen. The hydrogen is given off at one of the electrodes, and the oxygen at the other. As the electrolysis continues and the water in the electrolyte solution is dissociated into its component parts to form the gasses, the water must be replaced, but the acid itself remains in the solution.

The gasses produced should be kept separate, since, in the case of hydrogen and oxygen, the two gasses together form an explosive mixture. This separation can be maintained by placing a membrane between the electrodes.

Since the amount of gas produced is proportional to the current, but not the pressure under which the cell operates (except at the extremes), the gasses may be produced at relatively high pressures with negligible increases in the power consumed.

Other types of electrolytic cells may also be used as gas generator 51. A cell comprising a nickle anode and iron cathode immersed in a solution of sodium hydroxide in water produces oxygen at the anode and hydrogen at the cathodes. Nickel electrodes immersed in a solution of potassium carbonate may also be used to produce hydrogen and oxygen.

The Thermal Energy Source

The thermal energy source 21 may be one of a number of available apparatuses for transferring thermal energy to the fluid circulating in the loop. The purpose of the thermal energy source 21 is to increase the temperature of the liquid in column 13 relative to the liquid in column 15 so that a density differential is established between the mercury in the two columns, causing a convective flow of the fluid liquid around the loop. Thus, the greater the temperature differential that can be established, the greater the convective flow of the liquid.

Particularly appropriate as a thermal energy source, in light of the interest in renewable resources, is a heat exchanger drawing heat from a solar heated reservoir. Panels for heating liquids such as water using solar energy are commercially available in many sizes from numerous sources, as are containers for storing the solar heated water. Heat exchangers are also readily available that can be coupled to the closed loop and are suitable for circulating the heated water from the reservoir and transferring its heat to the mercury circulating in the closed loop. Such apparatus can provide a 40° temperature differential, which is suitable for operation of the system.

Also appropriate would be the use of a heat exchanger circulating geothermally heated water. Geothermally heated water often is at a much higher temperature than solar heated water would be, on the order of 120°–180° C., and thus would be able to produce a greater temperature differential between the mercury in column 13 and the merciry in column 15. This increased temperature differential is advantageous in that the density differential between the mercury in the two columns is greater, and consequently the convective flow of the mercury is increased. But, the availability of geothermal energy is limited.

In addition to the sources of thermal energy just discussed, a fossil fuel burner of conventional design may be used as thermal energy source 21 to directly heat the circulating mercury.

Since the important consideration for operation of the system is the temperature differential between the liquid in the two columns 13 and 15, heat exchanger 31 must be connected to a heat sink capable of absorbing from the liquid the heat transferred to it by thermal energy source 21. In a system located in a temperature climate, this is most effectively done by circulating in the heat exchanger cool water drawn from a large reservoir kept cool by isolating it from exposure to the sun. In a colder climate, a large body of ice may be used, which would permit the temperature of the mercury to be reduced to 0° C., or perhaps lower.

Operation of the System

In operation, thermal energy is added by heat source 21 to the conducting fluid in the first column 13 to lower the density of the fluid in that column, thereby inducing a convective flow of the mercury. The heat so introduced into the conducting fluid is removed by the heat exchanger 31 at the top of the second column 15 to ensure the continuation of the temperature differential (and the density differential) between the mercury in the first and second columns. As the fluid flows downward in the second column, it flows through the throat section 17 of the MHD 101 in a direction perpendicular to the magnetic field established by the magnet 111. This flow, by reason of Faraday's Laws, creates an electric potential between the sides of the throat section 17, which is tapped by the electrodes 133 and 135. This purely temperature-induced convective flow through the MHD will generate a very low power output. The power output is low due to the low velocity of the electrically conducting fluid through the MHD.

The electric potential is produced in the following manner: When a sheet of conducting material, e.g. mercury, is passed through a magnetic field that is perpendicular to the direction in which the conducting material is moving, an electric potential develops between points on the sheet of conductive material that lie on an axis perpendicular to both the direction of movement of the conductive sheet and the direction of the magnetic field.

As the conductive fluid flows with velocity v through the perpendicular magnetic field B, a force is exerted on each charge carrier in a third, mutually perpendicular direction. This force F is given by the vector equation:

$$F = qv \times B$$

in which q is the charge of each charge carrier. The electric field intensity (E) resulting from this force is given by the vector equation:

$$E = F/q = v \times B.$$

This electric field yields an electric potential between two sides of the channel through which the conductor flows. This potential is:

$$E = \int E \cdot dL = \int (v \times B) \cdot dL$$

in which L represents the width of the sheet of conductive fluid.

In the MHD loop, flow equilibrium is reached when the electromotive force so generated equals the force driving the fluid flow, the differences in the weight of the mercury in the two columns.

By using the electric power generated by the MHD 101 to electrolyze a second fluid in gas generator 51 and introduce the gasses so generated into the rising first column 13, the efficiency of the system can be greatly increased due to the increased rate of flow of the electrically conducting fluid through the MHD. When the gasses produced by the electrolytic gas generator 51 are introduced into the first column 13, the density and weight of the mercury in that column is substantially decreased, which increases the density and weight differentials between the fluid in the first column 13 and the fluid in the second column 15. This increased differential greatly enhances the convective flow of the mercury around the loop, increasing the rate of flow of the conductive fluid through the throat 17 of the MHD section of the loop. As this flow through the throat section is increased, so is the power produced by the MHD. This increase continues until a new flow equilibrium is reached.

The gasses introduced into the loop, which contain chemical energy, are separated from the conducting fluid at the top of the loop by the gas separator 71 and may be put to any of a number of uses, as mentioned above.

Each cycle of flow (once around the loop) extracts an amount of energy proportional to the weight difference between the two columns (represented by the equation $E = dW \times h$, in which dW is the difference in weight and h is the height of the column). The amount of power that can be obtained from the system depends upon the speed or time it takes to complete the stroke, i.e., the rate at which the work is done. Thus, the power is given by the equation $P = dW \times v$, in which v is the speed of the fluid flow.

As the system continues to operate, the MHD 101 may generate more power than is needed to operate the electrolytic gas generator 51. When this occurs, electrical leads 45 may be attached to an external load suitable for using this excess power. Alternately, electrical leads 45 may be connected to a battery to store the power for later use. Accordingly, the system may be advantageously used to convert the thermal energy supplied by thermal energy source 21 to both chemical energy in the form of gasses and electrical energy.

ALTERNATIVE EMBODIMENTS

General System

Alternatively to using a single upflowing column 13 in the MHD loop 11, two or more columns 13a and 13b may be used, as shown in FIG. 7. In this embodiment, one of the gasses produced by electrolytic gas generator 51, for example the oxygen may be injected into column 13a and the other gas, the hydrogen, may be injected into column 13b. In this way, both the gasses produced may be used to supplement the convective flow, while keeping the gasses separate. Since both gasses produced by the gas generator are used, the utility of the feedback of the electrical energy generated by the MHD 101 is enhanced. This embodiment requires at least two gas separators 71a and 71b (one to separate each gas out of the flow), and a gas injector 59a and 59b for each column 13a and 13b.

The Electrolytic Gas Generator

Figure 8:
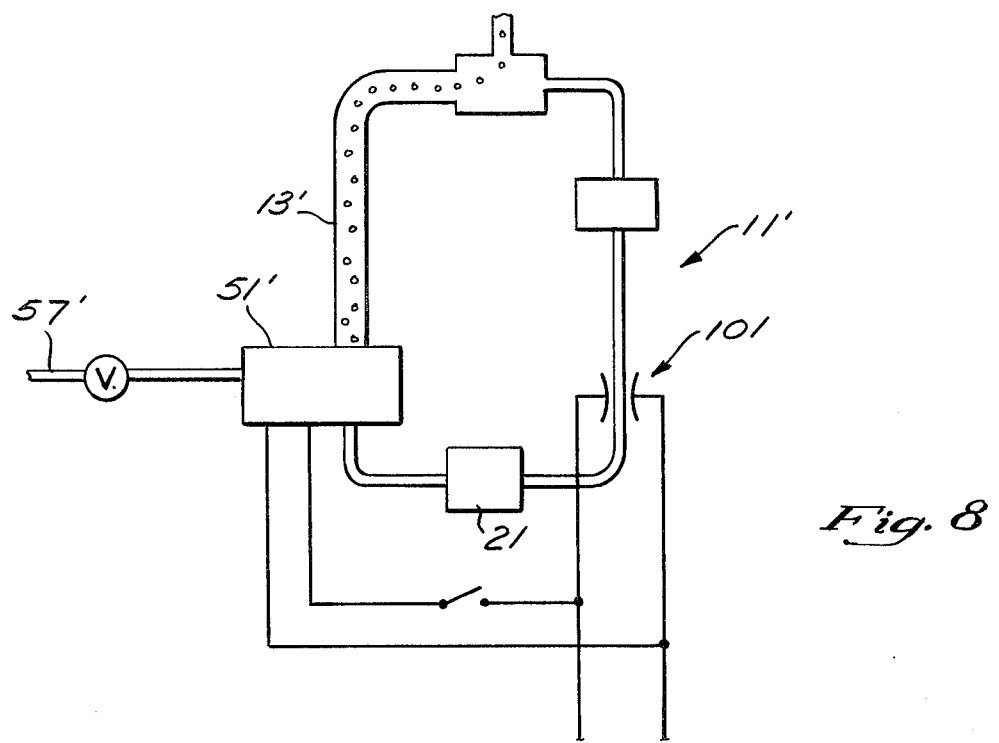
FIG. 8 is a schematic drawing of a second alternative embodiment of the Thermal Energy Conversion System.

As an alternative to using a liquid metal such as mercury in the MHD loop 11 and electrolyzing a separate electrolyte in gas generator 51, an electrolyte may be circulated through the MHD loop 11' (FIG. 8) and passed through electrolytic gas generator 51' so that the MHD working fluid itself is electrolyzed. From gas generator 51' part or all of the gasses may be injected into the column 13'. Pipe 57' allows whatever of the gasses are not injected into column 13' to be diverted and put directly to use.

I claim:
1. An apparatus for converting thermal energy into chemical energy, comprising:
 (1) a closed fluid loop through which flows an electrically conducting liquid, said loop comprising:
   (a) a first substantially vertical column;
   (b) a second substantially vertical column;
   (c) interconnection means between the top of said first column and the top of said second column; and
   (d) interconnection means between the bottom of said first column and the bottom of said second column.
 (2) means for creating a temperature differential between the portions of said liquid in each column by heating the portion of said liquid in said first column and cooling the portion of said liquid in said second column to form a density differential in said liquid and establish a convective flow of said liquid through said loop;

(3) a magnetohydrodynamic generator coupled to said loop for generating electrical energy from said flowing liquid, the amount of electrical energy generated being proportional to the velocity of the said liquid; and (4) means for supplementing said convective flow to increase the electrical energy generated by said magnetohydrodynamic generator by increasing the density differential between the liquid in each of said columns, comprising:

(a) an electrolytic gas generator coupled to said mangetohydrodynamic generator for using at least a portion of said electrical energy to electrolyze a second liquid to form a gas, said gas containing said chemical energy;

(b) means for introducing a portion of said gas into said first column to decrease the density of the portion of said liquid in said first column and increase the density differential between the portions of said liquid in each column; and (c) means for removing said gas near the top of said first column.

2. The apparatus of claim 1, wherein said magnetohydrodynamic generator comprises:

(1) a throat segment of said second vertical column through which said liquid flows;

(2) a magnet creating a magnetic field perpendicular to said flow of said liquid through said throat segment so that as said liquid flows through said throat segment an electric potential is created between two sides of said throat segment; and (3) electrodes coupled to said throat segment, said electrodes tapping said electric potential.

3. The apparatus of claim 2, wherein said throat segment is of smaller cross sectional area than another section of said second vertical column to provide a venturi effect to said flow.

4. An apparatus for converting thermal energy into chemical energy, comprising:

(1) a closed fluid loop through which flows an electrically conducting liquid, said loop comprising:

(a) a first substantially vertical column;

(b) a second substantially vertical column;

(c) interconnection means between the top of said first column and the top of said second column; and (d) interconnection means between the bottom of said first column and the bottom of said second column.

(2) means for creating a temperature differential between the portions of said liquid in each column by heating the portion of said liquid in said first column and cooling the portion of said liquid in said second column to form a density differential in said liquid and establish a convective flow of said liquid through said loop;

(3) a magnetohydrodynamic generator coupled to said loop for generating electrical energy from said flowing liquid, the amount of electrical energy generated being proportional to the velocity of the said liquid; and (4) means for supplementing said convective flow to increase the electrical energy generated by said magnetohydrodynamic generator by increasing the density differential between the liquid in each of said columns, comprising:

(a) an electrolytic gas generator coupled to said magnetohydrodynamic generator for using at least a portion of said electrical energy to electrolyze a portion of said conducting liquid to form a gas, said gas containing said chemical energy;

(b) means for introducing a portion of said gas into said first column to decrease the density of the portion of said liquid in said first column and increase the density differential between the portions of said liquid in each column; and (c) means for removing said gas near the top of said first column.

5. An apparatus for efficiently converting thermal energy into an alternate form of energy, comprising:

(1) A fluid conduit through which flows a fluid, wherein said conduit comprises:

(a) a first, substantially vertical, leg;

(b) a second, substantially vertical, leg;

(c) first communication means between the top of said first leg and the top of said second leg; and (d) second communication means between the bottom of said first leg and the bottom of said second leg;

(2) first means for adding thermal energy to said fluid, to create a flow of said fluid, wherein:

(a) said fluid flows upward through said first leg; and (b) said fluid flows downwardly through said second leg;

(3) second means coupled to said conduit near the bottom of said second leg for generating electrical energy from said flowing fluid;

(4) third means coupled to said second means for using at least a portion of said electrical energy to form a gas, said gas containing chemical energy; and (5) fourth means for introducing into said conduit at least a portion of the gas formed by said third means so that the rate of flow of said fluid is increased.

6. The apparatus defined in claim 5 wherein:

(1) said third means for forming a gas is an electrolytic gas generator that electrolyzes a second fluid; and (2) said fourth means for using said gas comprises means coupled to said conduit and to said third means for introducing said gas into said first leg.

7. The apparatus defined in claim 5, wherein:

(1) said fluid is an electrolyte;

(2) said third means for forming a gas is an electrolytic gas generator that electrolyzes a portion of said fluid; and (3) said fourth means for using said gas comprises means coupled to said conduit for introducing said gas into said first leg.

8. The apparatus defined in claim 6 or 7, additionally comprising fifth means coupled to said conduit for removing said gas from said conduit wherein said fifth means is coupled to said conduit near the top of said first leg.

9. The apparatus defined in claim 5, additionally comprising means for removing said thermal energy from said fluid, wherein:

(1) said first means for adding thermal energy is coupled to said conduit on said first leg; and (2) said means for removing thermal energy is coupled to said conduit near top of said second leg.

10. The apparatus defined in claim 9, wherein said means for removing said thermal energy comprises:

(1) a heat exchanger coupled to said conduit; and (2) a heat sink interconnected with said heat exchanger, suitable for absorbing the heat removed from said fluid by said heat exchanger.

11. The apparatus defined in claim 5, wherein said first means for adding thermal energy comprises:
(1) a heat exchanger coupled to said conduit near the bottom of said first leg; and
(2) a heat source interconnected with said heat exchanger suitable for supplying thermal energy to said heat exchanger.

12. The apparatus defined in claim 11, wherein:
(1) said heat source comprises a quantity of a third fluid; and
(2) said quantity of a third liquid is heated by solar radiation.

13. The apparatus defined in claim 5, wherein:
(1) said third means for forming a gas is an electrolytic gas generator that produces one or more gasses;
(2) said conduit additionally comprises a third, substantially vertical, leg in which said fluid flows upwardly;
(3) said fourth means is suitable for introducing some of said gasses produced by said gas generator into said first leg; and
(4) said fourth means is suitable for introducing an additional portion of said gasses produced by said gas generator into said third leg.

* * * * *